Patented Nov. 20, 1928.

1,692,224

UNITED STATES PATENT OFFICE.

EDUARD RITSERT, OF FRANKFORT-ON-THE-MAIN, GERMANY.

AMINO AROMATIC ESTERS FOR USE AS ANÆSTHETICS AND METHOD OF MAKING SAME.

No Drawing. Application filed April 27, 1926, Serial No. 105,015, and in Germany May 14, 1925.

My invention refers to a new composition of matter adapted for use as an antiseptic and local anæsthetic and to the method of producing same.

As is well known to those skilled in the art the amino carboxylic esters, which are highly valued in their quality of non-poisonous local anæsthetics, are capable of forming with aromatic sulfo acids salts, which in their dilute watery solutions do not exert any corrosive action and are therefore also adapted to serve for subcutaneous injections.

On the other hand these compounds are not suitable for treating open wounds inasmuch as their dilute solutions do not favor cicatrization and more concentrated solutions as well as the solid substances cause violent irritation or corrosion. The treatment of open wounds has hitherto been carried out with mixtures of the pure amino benzoic acid ester with antiseptic substances such as "Dermatol" or boric acid, in order to obtain in this manner beside the sedative effect also an antiseptic action. These mixtures, however, involve the great disadvantage that owing to the low melting point (below 100° C.) of the non-poisonous amino carboxylic acid esters they cannot be sterilized, so that their utilization for a good many purposes, for instance for the treatment of operated surfaces, the injection in the form of powder suspensions and so on is rendered well nigh impossible.

According to the present invention I obtain compounds which are well adapted for the treatment of wounds and which have no corrosive action but simultaneously act as anæsthetics and antiseptics, by replacing the simple aromatic sulfo acids by the aromatic halogenated sulfo acids such as the aromatic iodo sulfo acids or bromo sulfo acids or their derivatives or salts, which are made to react with the esters of the amino carboxylic acids or their derivatives or salts.

The halogenated sulfo acid salts of the amino carboxylic acid esters thus obtained are distinguished from the non-halogenated sulfo acid salts by dissolving in water only with great difficulty. As compared with the carboxylic acid esters they involve the great advantage of melting at a temperature above 100° C. and therefore being easily sterilizable.

In consequence of their being difficultly soluble the novel compounds, when being brought into contact with open wounds, produce an anæsthetic effect of long duration without exerting any irritating action. Their anæsthetic effect is combined with remarkable antiseptic properties which are due not only to their chemical components but also to their physical properties, more especially to the great absorptive power.

The novel compounds are thus well adapted for the treatment of operation wounds, burns and the like, but they can also be used for other therapeutical purposes and more especially for injections in the form of suspensions.

Clinical investigation has shown that the novel compounds, apart from their powerful anæsthetic and antiseptic action also act towards favorably influencing the formation of the epithelium and the healing process. This has been shown also when treating burns caused by the action of X-rays.

The preparation of the novel compounds can simply proceed in such manner that equimolecular quantities of the components are caused to react on each other in the presence of solvents, only small quantities of such solvents being required. It is for instance possible to obtain reaction by causing the finely powdered components to act on each other in the presence of a small quantity of water or other suitable liquids, for instance blood serum.

*Example 1.*—47.4 parts of the sodium salt of biiodo para phenol sulfo acid

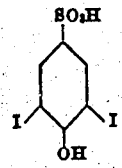

are dissolved in 500 parts of water and to the solution is admixed by stirring and at a comparatively low temperature a slightly acidulated solution of 20.15 parts of para amino benzoic acid ethyl ester hydrochloride

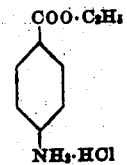

in 500 parts of water. The novel compound resulting in the reaction and having the formula

is precipitated almost quantitatively. It is separated from the liquid by filtering under pressure and is washed with water and, if desired, also with alcohol. In order to obtain the product in its pure state for analysis it can be recrystallized from alcohol. There result white needles which are easily soluble in alcohol, but more difficultly in water and have a melting point of 225° C. (under decomposition). They have a fair anæsthetic action. Such parts of the novel compound as have remained over in the mother liquor can be recovered by salting out.

*Example 2.*—A solution of 37.3 g. of the potassium salt of bibromo para phenol sulfo acid

in 500 parts of water is made to react with a solution of 20.5 g. para amino benzoic acid ethyl ester hydrochloride

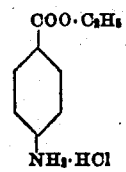

in 300 ccms. water and the product of reaction is subjected to further treatment as described with reference to Example 1. After recrystallization from alcohol the substance is obtained in the form of pure white crystals, melting at 193–200° C. and having a good anæsthetic action. Its formula is

*Example 3.*—17.9 parts of para amino benzoic acid propyl ester.

are heated in 500 ccms. of dilute hot alcohol (containing for instance equal parts of water and alcohol) with 35.1 parts of

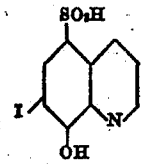

until solution has almost taken place. The mixture is then allowed to cool down and is filtered. When cooled down yellowish white crystals separate out which are obtained by recrystallization from dilute alcohol with pure white color and melting at 225–228° C. The product has the formula

*Example 4.*—A solution of 47.4 parts of the sodium salt of biiodo para phenol sulfo acid

in 500 parts of water is mixed with a solution of 21.5 parts para amino benzoic acid propyl ester hydrochloride

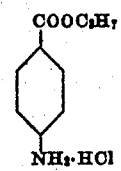

in 500 parts of water and treated as described with reference to Example 1. There result white needles which are soluble in water with difficulty, but are easily soluble in alcohol. They melt at 224° C. under decomposition and have a powerful anæsthetic action. The product has the formula $C_6H_2 \cdot OH \cdot I_2 \cdot SO_3H \cdot NH_2 \cdot C_6H_4 \cdot COOC_3H_7 + NaCl.$

*Example 5.*—A solution of 47.4 parts of the sodium salt of biiodo para phenol sulfo acid

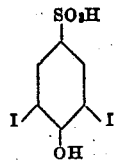

in 500 parts of water is made to react with a solution of 22.95 parts of para amino benzoic acid isobutyl ester hydrochloride

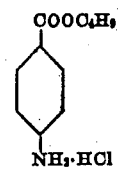

in 100 parts of water the further treatment being carried out as described with reference to Example 1. There result white needles having a silky gloss, which dissolve easily in alcohol, with difficulty in water, which melt under decomposition at 222–224° C. and have a powerful anæsthetic action. The product has the formula

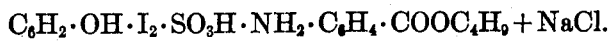

*Example 6.*—47.4 parts of the sodium salt of biiodo para phenol sulfo acid

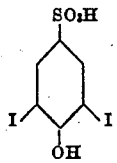

are intimately triturated with 20.15 parts of para amino benzoic acid ethyl ester hydrochloride

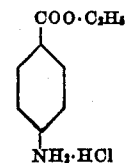

and are mixed with 150 parts of water. The mixture which at first is thinly fluid, solidifies with the reaction to a brittle mass which after having been subjected to pressure can be dried at low temperature or can be treated further as described with reference to Example 1. There result the same substances as those obtained from the solution, viz, white needles melting at 223–225° and having a powerful anæsthetic action. The product has the formula

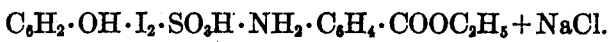

In the appended claims the term "a compound containing a sulfo acid radical" is designed to include the respective acids as well as their compounds and more especially the salts thereof.

I wish it to be understood that I do not desire to be limited to the exact compounds, figures and sequence of operations above described for obvious modifications will occur to a person skilled in the art.

I claim:

1. The method of producing an antiseptic and anæsthetic comprising combining an aromatic amino carboxylic acid ester with a compound containing a halogenated non-aliphatic sulfo acid radical.

2. The method of producing an antiseptic and anæsthetic comprising combining an aromatic amino carboxylic acid ester with a compound containing a halogenated aromatic sulfo acid radical.

3. The method of producing an antiseptic and anæsthetic comprising combining an aromatic amino carboxylic acid ester with a compound containing a non-aliphatic iodo sulfo radical.

4. The method of producing an antiseptic and anæsthetic comprising combining an aromatic amino carboxylic acid ester with a compound containing an aromatic iodo sulfo acid radical.

5. As a new composition of matter, a halogenated non-aliphatic sulfo acid compound of an amido carboxylic acid ester, being soluble in water only with great difficulty, having a melting point above 100° C. and a powerful antiseptic and anæsthetic effect.

6. As a new composition of matter, a non-aliphatic iodo sulfo acid compound of an amido carboxylic acid ester, being soluble in water only with great difficulty, having a melting point above 100° C. and a powerful antiseptic and anæsthetic effect.

In testimony whereof I affix my signature.

EDUARD RITSERT.